United States Patent [19]
Lyle et al.

[11] Patent Number: 5,299,350
[45] Date of Patent: Apr. 5, 1994

[54] METHOD FOR JOINING A MOTOR SHELL AND BASE

[75] Inventors: David M. Lyle; Richard D. Meyer, both of El Paso; Jack N. Peck, Waco, all of Tex.

[73] Assignee: MagneTek Century Electric, Inc., St. Louis, Mo.

[21] Appl. No.: 897,292

[22] Filed: Jun. 11, 1992

[51] Int. Cl.⁵ ............................................. H02K 15/14
[52] U.S. Cl. ........................................ 29/596; 29/512; 310/42; 310/89
[58] Field of Search ................. 29/596, 598, 509, 512, 29/521, 524; 310/89, 90, 91, 42

[56] References Cited

U.S. PATENT DOCUMENTS

| | | |
|---|---|---|
| 2,992,857 | 7/1961 | Lemmerz . |
| 3,289,018 | 11/1966 | Schaefer . |
| 3,313,968 | 4/1967 | Kaiser . |
| 3,579,809 | 5/1979 | Wolf et al. . |
| 3,707,037 | 12/1972 | Gutris . |
| 4,309,815 | 1/1982 | Schmitt et al. . |
| 4,459,735 | 7/1984 | Sawdon . |
| 4,465,946 | 8/1984 | Springer . |
| 4,739,206 | 4/1988 | Sieber . |
| 4,809,429 | 3/1989 | Martin . |
| 5,051,020 | 9/1991 | Schleicher .................. 29/521 X |

Primary Examiner—Carl E. Hall
Attorney, Agent, or Firm—Seldon & Scillieri

[57] ABSTRACT

A cylindrical shell for a motor/generator may be formed by cutting a rectangular blank, offsetting an edge, rolling the blank into a cylinder with the offset edge overlapping its opposite edge, punching through the overlapping edges to interlock them and form the cylinder, and then joining a base to the cylinder through a similar interlocking, punching process. In a variation, the base may be simultaneously joined to the cylinder as the edges are punched. Holes, or holes with locating nibs, may be used to align the blank in a cylindrical shape to reliably control the shell I.D. during fabrication.

10 Claims, 2 Drawing Sheets

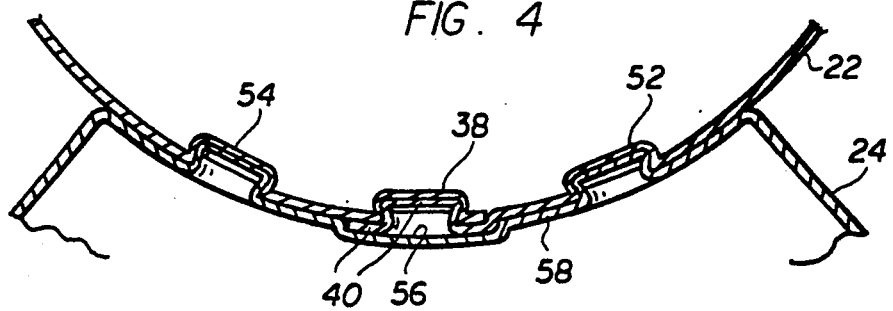
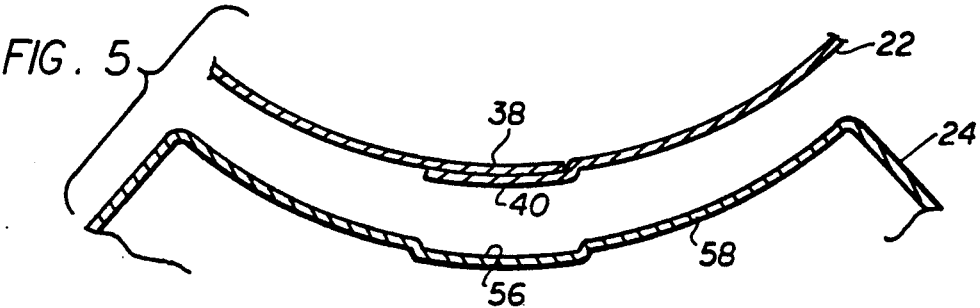
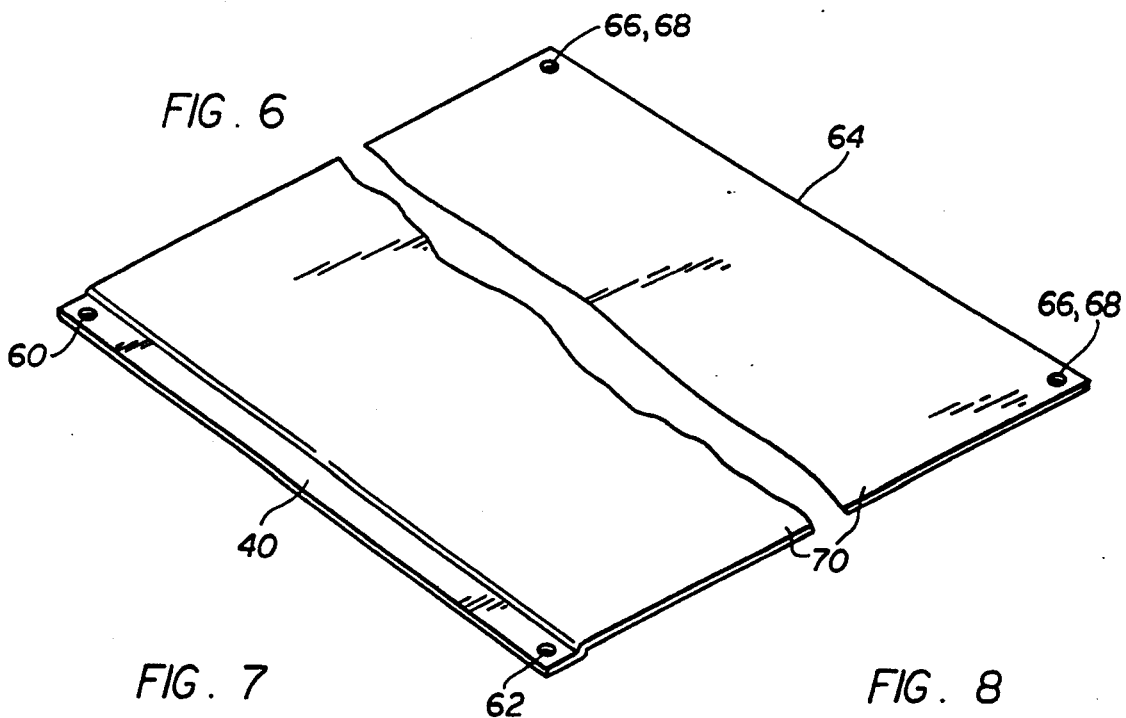
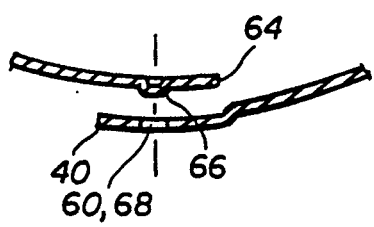
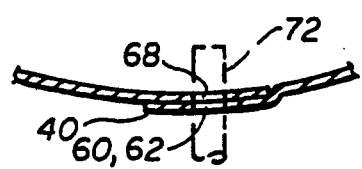

METHOD FOR JOINING A MOTOR SHELL AND BASE

BACKGROUND AND SUMMARY OF THE INVENTION

Cylindrical shells are typically used for encasing motors, generators, and other rotating dynamoelectric devices, such as fractional horsepower motors. In the prior art, these cylindrical shells have been formed by a process which involves first cutting a flat rectangular piece of sheet steel, rolling it into a cylinder with the edges abutting, and resistance welding the edges together. The resistance weld may be cleaned up by grinding or the like to finish the shell cylinder The diameter and length of the shell is then checked and adjusted to size. Next, a rigid base for mounting of the motor is attached to the shell by another welding process at what may be six locations in the cradle of the base. This process is widely used throughout the motor industry for forming cylindrical shells and attaching bases to those shells to encase motors In order to improve this process by reducing steps and costs, the inventor herein has succeeded in designing and developing a process for forming a cylindrical motor shell, as well as attaching a base thereto, which eliminates welding, grinding, and permits production line processes to be used. With this invention, a process is implemented which includes the steps of forming a blank of a flat rectangular piece of sheet steel, as before. Next, an edge of the blank is offset so that as the blank is rolled into a cylinder, the offset edge conveniently overlaps with its opposite edge. The overlapping edges are then joined with a single press stroke which interlocks the edges. The tooling and interlocking method is commercially available under the trade name Tog-L-Loc ® from BTM Corporation in Marysville, Mich. With the interlock formed by the Tog-L-Loc ® process, not only are the overlapping edges joined to withstand significant shear loads, but may also withstand "peel" loads which might otherwise tend to separate the shell as the motor is used under load. This is especially important as the Tog-L-Loc ® method is also used to attach the base to the cylindrical shell either simultaneously with joining the overlapping edges, or in a separate step after the cylinder has been formed. As can be appreciated, with a side load of any appreciable amount, a force is created which has a tendency to "peel" the motor and shell from the base. With the Tog-L-Loc ® interlock, sufficient strength is provided to prevent this "peeling" and hence is sufficient for this application.

As is well known, there are many punching, staking, and other prior art methods for joining two pieces of metal which, to the inventor's knowledge, have never been successfully used for this application. All of these prior art methods are directed to providing shear strength and are generally considered by those of ordinary skill in the art to adequately join two pieces of metal to resist shear forces. However, the same is not true for peel forces and it is believed that this low peel strength has prevented the adoption and use of these prior art punching, staking methods for being utilized for this particular application. Also, for smaller motor shells as would be used in fractional horsepower motors, those of ordinary skill in the art would typically consider that prior art tooling would seem to be too expensive, or very difficult, to create.

Perhaps another reason why those of ordinary skill in the art have been unsuccessful in adapting any kind of punching or staking operation to this application is that the typical motor/generator design incorporates a full round lamination. Therefore, if the inner surface of the cylindrical shell is interrupted, then a full round lamination will not conveniently fit therewithin. However, there are other motor/generator designs which do not utilize the full round lamination and hence would be particularly adapted for use with the present invention.

In addition to the method and apparatus for forming and joining the cylindrical shell to its base with an interlocking process, the inventor herein has also succeeded in developing a method useful in this process for holding the cylindrical shell I.D. as the interlocks are formed without the need to "size" or expand the shell to proper dimension after forming, as is presently done with the prior art processes.

While the principal advantages and features of the present invention have been described above, a more complete and thorough understanding of the invention may be attained by referring to the drawings and description of the preferred embodiment which follow.

BRIEF DESCRIPTION OF THE DRAWINGS

FIG. 4 is a partial cross-sectional view of a cylindrical shell with overlapping edges interlocked, and the base separately interlocked to the shell;

FIG. 5 is a view of the cylinder blank having overlapping edges and aligned for fit with a motor base;

FIG. 6 is a perspective of the blank formed with offset edge for assembly into a cylindrical shell with locating structure;

FIG. 7 is a partial cross-sectional view of a locating nib for holding the I.D. of the cylindrical shell as it is assembled; and FIG. 8 is a partial cross-sectional view of a rod inserted through matching holes to hold the cylindrical shell I.D. as the shell is interlocked.

DETAILED DESCRIPTION OF THE PREFERRED EMBODIMENT

Figure 1:
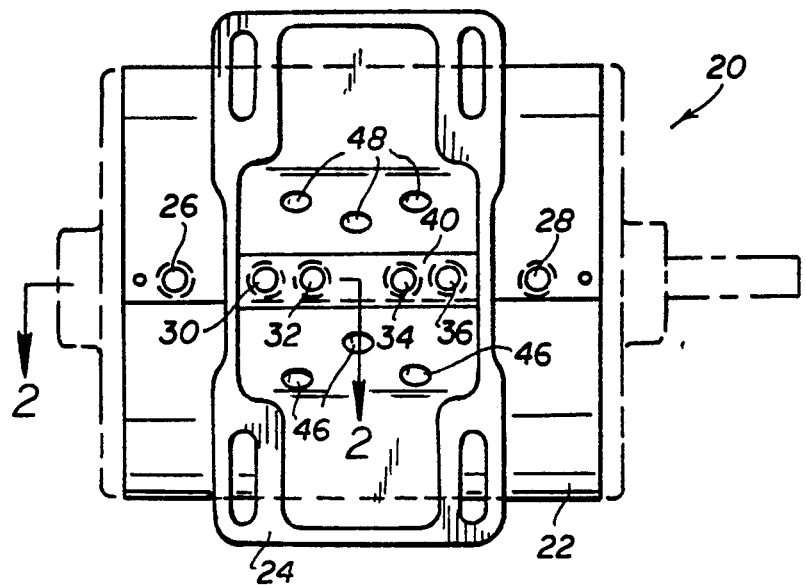
FIG. 1 is a bottom view of a motor/generator having a cylindrical shell and base formed with the interlocks of the present invention.
Figure 2:
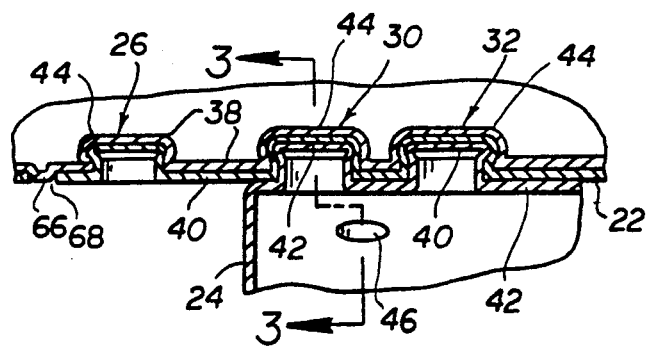
FIG. 2 is a partial cross-sectional view taken along the plane of line 2—2 in FIG. 1 and detailing the interlocks securing the overlapping edges and base in a single stroke.

As shown in FIG. 1, a fractional horsepower motor 20 includes a cylindrical shell 22 and a cradle base 24 secured to the bottom thereof. A first pair of interlocks 26, 28 secure overlapping edges of cylindrical shell 22 while four other interlocks 30-36 secure not only the overlapping edges but the base 24 all in one stroke. This is shown in greater in detail in FIGS. 2 and 3. As shown therein, interlocks 30, 32 have a first overlapping edge 38, a second overlapping edge 40 and a deformed portion 42 of base 24 all deformed and interlocked in a single stroke. This is contrasted with the interlock 26 which has only overlapping edges 38, 40 deformed therein.

It is noted that each of the interlocks, whether of the overlapping edges only such as shown in interlock 26, or when formed simultaneously with the base 24 to include three layers such as in interlocks 30, 32, all have a button-like member 44. This button-like member 44 resists peeling of the base 24 from the shell 22, as can be appreciated by one of ordinary skill in the art.

Figure 3:
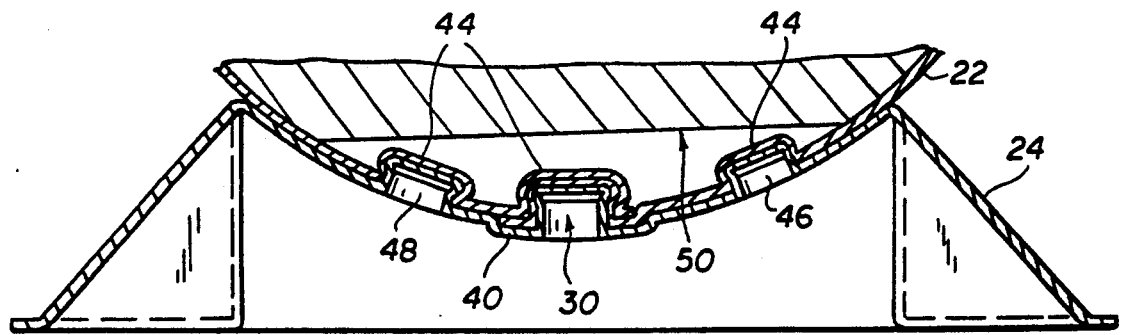
FIG. 3 is a partial cross-sectional view taken along the plane of line 3—3 further detailing the interlocks used for simultaneously joining the overlapping edges and base.

As shown in FIG. 3, extra interlocks 46, 48 may be used to lock the shell 22 directly to the base 24 at points other than at the overlapping edges. A motor/generator lamination 50 which has a flattened edge is desirably used in the shell 22 in order to avoid interference with the buttons 44 formed by the interlock process of the present invention.

As a variation to the present invention, the overlapping edges 38, 40 may first be joined with an interlock and the base 24 separately joined by interlocks 52, 54 to the shell 22. An indentation 56 may be conveniently formed in the cradle 58 of base 24 to accommodate the offset edge 40. This indentation 56 is also conveniently used in the embodiment depicted in FIGS. 2 and 3 as well. This is detailed in FIG. 5.

As shown in FIGS. 6-8, the I.D. of the shell may be held during interlocking by utilizing one of two alternate approaches. For either approach, holes 60, 62 are located in the offset edge 40. At the opposite edge 64, either locating nibs 66 or matching holes 68 may be located such that as the cylindrical shell is formed by rolling the blank 70 shown in FIG. 6 into a cylinder, the nibs 66 conveniently fit within holes 60, 62; or alternately, holes 68 align with holes 60, 62 for placement of a rod 72 such that the cylinder may be held in a preformed manner as the interlocks are punched into the overlapping edges to thereby form the shell. By reliably controlling the shell's I.D., the blank 70 may be cut to length such that finished shells may be conveniently produced on a production basis without cutting the shell down to size, or adjusting the diameter of the shells to specification.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A method for fabricating a cylindrical shell for an electrodynamic machine comprising the steps of:
    preparing a blank of sheet metal having longitudinal edges,
    rolling the blank into a cylinder so that the edges are overlapping,
    joining said overlapping edges by pinching one edge into the other so that the edges are interlocked, and
    fastening a base onto said shell be punching said shell into said base so that said base and said shell are interlocked.

2. The method of claim 1 wherein the step of fastening the base includes the step of punching said overlapped and joined edges into said base to thereby interlock them.

3. The method of claim 2 wherein the step of preparing the blank includes the step of offsetting an edge thereof.

4. The method of claim 3 wherein the step of rolling the blank into a cylinder includes the step of aligning the offset edge with an opposite edge to thereby form said overlapped edges.

5. The method of claim 1 wherein the step of joining the overlapping edges includes the step of first aligning said base with said overlapping edges and then punching said overlapping edges and base together in the same stroke to thereby interlock them all together.

6. The method of claim 1 further comprising the steps of forming holes in the overlapping edges, and inserting a rod into the holes after the blank is rolled into a cylinder to thereby control the shell I.D.

7. The method of claim 1 further comprising the steps of forming holes and matching nibs in the overlapping edges, and wherein the step of rolling the blank includes the steps of aligning and inserting the nibs into their matching holes to thereby control the shell I.D.

8. A method for fabricating a cylindrical shell and base for an electrodynamic machine comprising the steps of:
    preparing a blank of sheet metal;
    rolling the blank into a cylinder so that the edges thereof are overlapping;
    aligning said base with said overlapping edges; and
    joining said overlapping edges and base in one stroke by punching them into each other to thereby interlock them.

9. The method of claim 8 wherein the step of preparing the blank includes the step of offsetting an edge thereof.

10. The method of claim 9 wherein the step of rolling the blank into a cylinder includes the step of aligning the offset edge with an opposite edge to thereby form said overlapped edges.

* * * * *